Nov. 22, 1949  T. T. HOLME  2,488,541
RETICLE ILLUMINATING SOURCE FOR
FIREARM SIGHTING DEVICES
Filed March 22, 1946  3 Sheets-Sheet 1
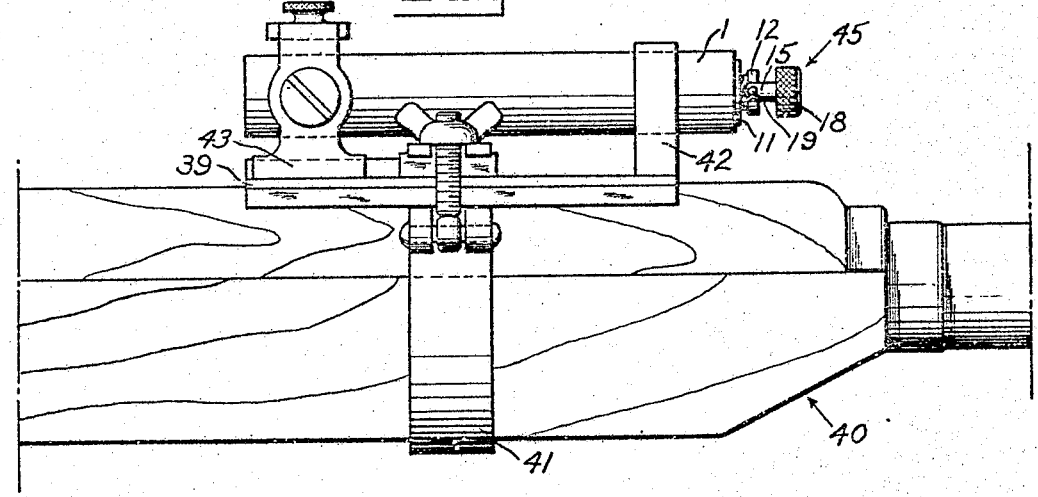
Fig_1_
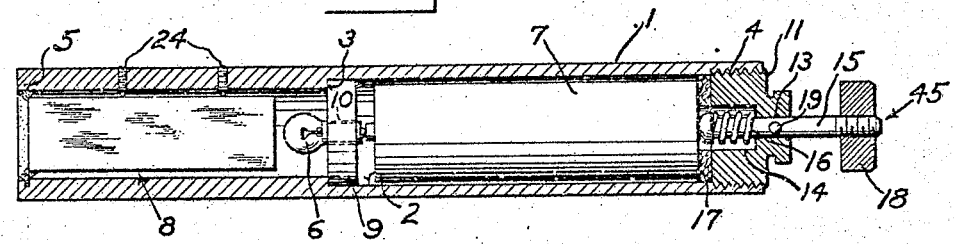
Fig_2_
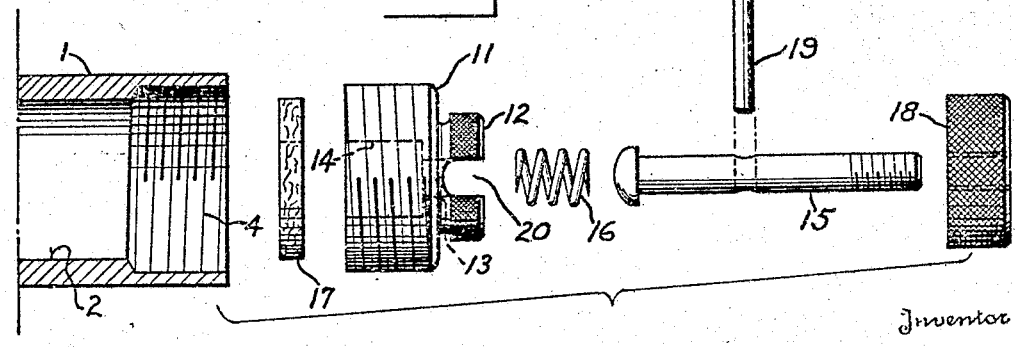
Fig_3_
Inventor
Thomas T. Holme
By J. H. Church & H. E. Thibodeau
Attorneys Nov. 22, 1949     T. T. HOLME     2,488,541
RETICLE ILLUMINATING SOURCE FOR
FIREARM SIGHTING DEVICES
Filed March 22, 1946     3 Sheets-Sheet 2
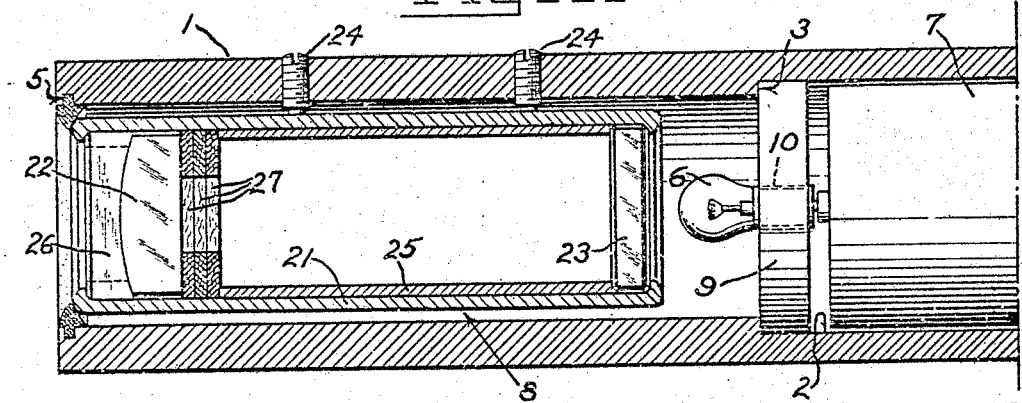
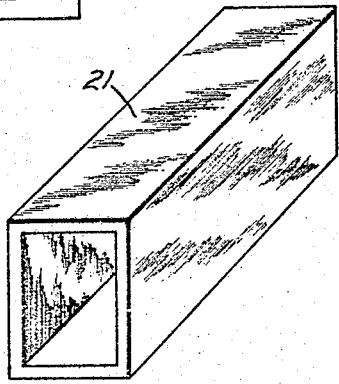
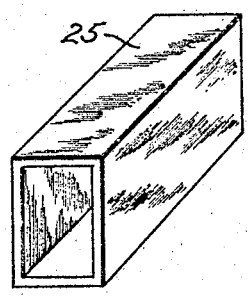
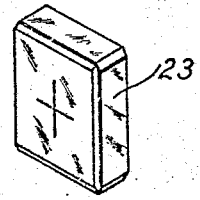
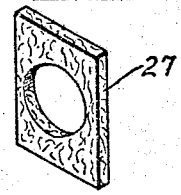
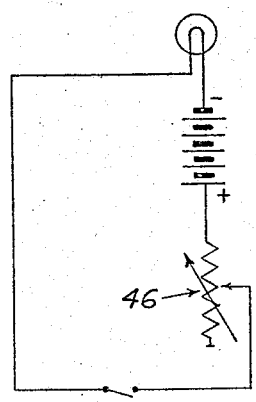
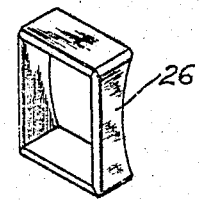
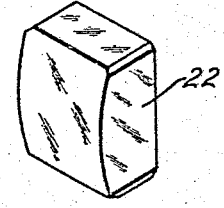
Inventor
Thomas T. Holme
By J. H. Church & H. C. Thibodeau
Attorneys Patented Nov. 22, 1949

2,488,541

UNITED STATES PATENT OFFICE 2,488,541

RETICLE ILLUMINATING SOURCE FOR FIREARM SIGHTING DEVICES

Thomas T. Holme, Springfield, Mass.

Application March 22, 1946, Serial No. 656,242

2 Claims. (Cl. 250—71)

(Granted under the act of March 3, 1883, as amended April 30, 1928; 370 O. G. 757)

1

The invention described herein may be manufactured and used by or for the Government for governmental purposes, without the payment to me of any royalty thereon.

The sighting of firearms at night or when light is very poor has always been a difficult problem. The ability of the eye to accurately align a rear sight aperture, a front sight blade and a target requires reasonably good illumination, especially on the sighting elements, hence night firing has always been a haphazard operation with results very uncertain.

This invention accordingly provides means whereby the difficulties of night shooting can be largely overcome and a rifle can be accurately aimed whenever there is light enough to definitely discern the target with the unaided eye.

The specific nature of the invention as well as other objects and advantages thereof will clearly appear from a description of a preferred embodiment as shown in the accompanying drawings in which:

Fig. 1 is a fragmentary side elevational view of a firearm having a sighting device mounted thereon.

Fig. 2 is a longitudinal sectional view of the night sighting device.

Fig. 3 is an enlarged exploded view showing the details of the switch.

Fig. 4 is an enlarged detail view in longitudinal section showing the collimator assembled to the tubular housing.

Fig. 5 is an isometric view of the collimator housing.

Fig. 6 is an isometric view showing the liner contained within the collimator.

Fig. 7 is an isometric view of the reticle.

Fig. 8 is an isometric view of one of the diaphragms.

Fig. 9 is an isometric view of the lens.

Fig. 10 is an isometric view of the lens retainer.

Fig. 11 is a schematic diagram of the wiring circuit.

Figure 12:
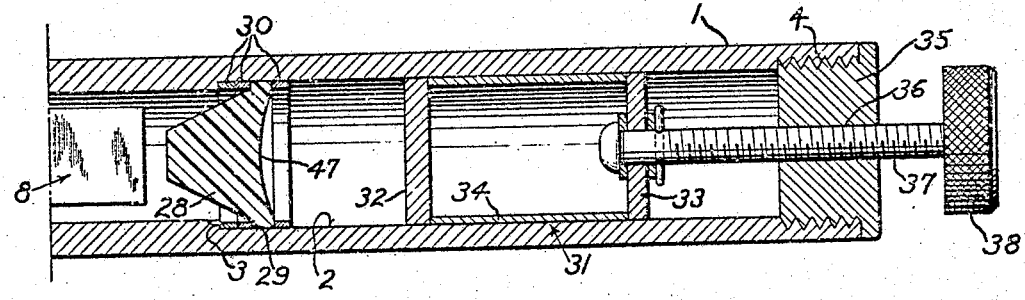
Fig. 12 is a fragmentary detailed view of an alternate light source for illuminating the reticle shown in longitudinal section.

In Fig. 2 there is shown in assembled relation a sight tube 1 embodying this invention. Tube 1 is counterbored as shown at 2 and such counterbore produces a shoulder 3. Threads 4 are provided on the interior surface of the right end of tube 1 as shown in Figs. 2 and 3 while on the left end of tube 1 there is provided an annular groove 5 on the inner periphery of such

2 tube and near the end thereof for a purpose to be later described.

In the counterbored portion 2 of tube 1 an electric lamp 6 and a dry cell battery 7 are inserted. Lamp 6 is provided to illuminate the reticle of a collimator 8 as will be later described. Lamp 6 is horizontally secured to a disk 9 by screwing such into a threaded axial hole 10, disk 9 preferably being made of brass. Disk 9 with lamp 6 secured thereto is inserted in the counterbored portion 2 of tube 1 so that disk 9 abuts shoulder 3 and lamp 6 faces collimator 8, disk 9 thereby grounding lamp 6 to tube 1. Battery 7 is placed adjacent disk 9 so that the positive terminal thereof contacts the base of lamp 6.

A threaded plug 11 is screwed into threads 4 of tube 1. Such plug is provided with an integral, horizontally disposed, forwardly extending head portion 12 and a transverse slot 20 is provided on the face thereof. An axial hole 13 is likewise provided in plug 11 and the inwardly facing end of such hole is counterbored as shown at 14.

A switch 45 is inserted in hole 13 and comprises a headed plunger 15, a helical spring 16, and a knob 18. The head portion of plunger 15 with spring 16 in abutting relation rests within counterbore 14. The stem portion of plunger 15 projects forwardly from plug 11 and knob 18 is secured by threads thereto. A washer 17 of electrical insulating material is placed between the base of battery 7 and plug 11 to prevent grounding. Spring 16 biases the head portion of plunger 15 through washer 17 into contact with the base of battery 7 thereby closing the circuit.

To hold switch 45 open, a transverse pin 19 is secured in suitable fashion to the stem portion of plunger 15. Thus pin 19 engages transverse slot 20 in head 12 of plug 11 when plunger 15 contacts the base of battery 7. To open the circuit, plunger 15 is pulled outwardly away from battery 7 against the bias of spring 16 whereupon knob 18 is rotated so that pin 19 is disposed across transverse slot 20 of plug 11, thus plunger 15 is restrained from contacting the base of battery 7.

The intensity of illumination of lamp 6 may be readily varied by any conventional variable resistance 46 shown only in a schematic wiring diagram illustrated in Fig. 11.

Collimator 8 comprises a tube 21, a lens 22 and a reticle 23 as shown in Fig. 4. Tube 21 is preferably of rectangular configuration. Reticle 23 comprises a glass plate, silver and copper plated on one side and such metallically coated side is engraved with a vertical and horizontal line which intersects in the center thereof. Reticle 23 is placed in the forward end of tube 21 and the end of such tube is crimped, thereby securing the reticle against displacement from that end of the tube. The lens 22 is placed in the other end of tube 21 and is separated from reticle 23 by a tubular separator 25. A lens retainer 26 surrounds lens 22 and the other end of tube 21 is crimped to secure objective lens 22 to collimator 8. To bring the reticle 23 into sharp focus when viewed through the rear end of collimator 8, a plurality of diaphragms 27 may be placed between separator 25 and lens 22 until proper adjustment is obtained.

Collimator 8 is assembled to tube 1 with reticle 23 facing lamp 6 and is secured therein by two screws 24 as shown in Fig. 4. A suitable adhesive pressed into annular groove 5 against the end of collimator 8 excludes foreign matter and water. The lamp 6 is readily lighted by turning knob 18 of switch 45 so that pin 19 slides into slot 20 on plug 11, thus permitting the bias of spring 16 to force plunger 15 into contact with the base of battery 7 thereby closing the circuit. Illumination from lamp 6 silhouettes reticle 23 so that such reticle is sharply defined against a brilliant background.

An alternative method for illuminating reticle 23 utilizes the light produced by the bombardment of alpha particles emanating from a radioactive material on zinc sulphide or other suitable material. The light therefrom is concentrated on reticle 23 by an arrangement shown in Fig. 12 and comprises mounting a truncated cone 28 of a transparent plastic material known as "Lucite" within counterbore 2 of tube 1. Light rays pass through such material in much the same manner that water passes through a pipe, the light rays being conveniently bent in any desired direction.

Truncated cone 28 having a slope of about 65° with respect to the base thereof has been found to produce the optimum intensity of light concentration on the reticle therein. The base of such truncated cone 28 is preferably concave as shown at 47 and is coated with zinc sulphide or other suitable material. Truncated cone 28 may be secured within counterbored portion 2 of tube 1 by suitable rings 30 placed on opposite sides of an integral annular flange 29 provided near the base of truncated cone 28.

Also mounted within counterbore 2 of tube 1 and oppositely disposed to the base of truncated cone 28 is a cylinder 31. Such cylinder may be solid or preferably may be constructed of two disks 32 and 33 connected by a tube 34. Disks 32 and 33 and tube 34 may be of any suitable material such as metal or plastic and are secured by any suitable means.

A threaded bearing plug 35 provided with a threaded axial hole 36 is screwed into the threaded end of tube 1 and in such hole there is screwed a threaded rod 37. One end of rod 37 is rotatably secured to disk 33 of cylinder 31 and a knurled knob 38 is fixedly secured to the outwardly projecting end of rod 37.

Rotation of knob 38 likewise rotates rod 37 thereby effecting longitudinal displacement of cylinder 31 by the threaded cooperation of such rod with threaded hole 36. A radioactive material is coated on the end of cylinder 31 facing the base of cone 28 and the alpha particles emitted by such radioactive material bombard the zinc sulphide material adhering to the base of truncated cone 28 thus producing a luminous glow. The light so produced passes through the "Lucite" cone 28 and is projected against reticle 23.

The light gathered by truncated cone 28 is concentrated and greatly intensified when it comes out the rear or small end of such cone. The intensity of such light however can be readily varied by moving cylinder 31 closer to or farther away from the base of cone 28 by means of threaded rod 37. Thus the intensity of light can be varied to suit any particular outside light condition.

Tube 1 with collimator 8 and either light source assembled thereto is mounted on the firearm preferably substantially ahead of the usual rear sight. A base 39 which is conveniently shaped to surround the handguard of a firearm 40 is secured thereto by a suitable clamp 41 as shown in Fig. 1. Conventional telescope mounts 42 and 43 are suitably mounted on top of base 39 and tube 1 is slidably secured within such mounts. The rear mount 43 is preferably adjustable for windage and elevation to facilitate alignment of the axis of collimator 8 with the bore of firearm 40 and the target.

To use the sight herein described the firer looks at the target with both eyes and brings the rifle into position so that the collimator intercepts the vision of the sighting eye. The rifle is then sighted by keeping the other eye focused on the target and moving the rifle until the reticle is seen by the sighting eye appears to be superimposed on the target. The vision of one eye being intercepted by the collimator and the light rays from the collimator being parallel, the eyes will automatically focus on the target.

It is, of course, essential that the sighting device be correctly mounted and accurately adjusted on the rifle the same as any other type of sight since the accuracy of the system can be no greater than the accuracy of the mounting.

It is therefore apparent from the above description and the appended drawings that the above described invention provides a means whereby a rifle can be accurately aimed at a target in poor or failing light.

I claim:

1. In a sighting device for a firearm having, a sight tube adapted to be mounted on the firearm, a reticle secured within the sight tube, a lens mounted within the sight tube, the lens being arranged to bring said reticle into sharp focus whereby the collimation axis may be clearly defined, the improvement comprising a light gathering body of light pervious material adapted to be mounted within the sight tube ahead of the reticle, said light gathering body comprising a truncated cone having a forwardly facing concave base coated with zinc sulphide or other material capable of emitting a luminous glow when exposed to a radioactive material, a second body slidably mounted within the tube disposed ahead of said light gathering body, said second body having a face coated with a radioactive material opposed to said zinc sulphide coated base whereby alpha particles from said radioactive material bombard the zinc sulphide to produce the luminous glow, said light gathering body adapted to concentrate light produced by the luminous glow on the reticle thereby sharply silhouetting the reticle, and means for longitudinally traversing said second body whereby the brilliancy of the luminous glow can be varied to suit surrounding light conditions.

2. In a sighting device for a firearm having a sight tube and a collimator therein, the improvement comprising a truncated cone-shaped lens of light-pervious material mounted within the sight tube ahead of the collimator, said lens having a forwardly disposed concave face coated with zinc sulphide or other material capable of emitting a luminous glow when exposed to a radioactive material, and a disk member mounted ahead of said lens in spaced relationship therewith, said disk member having a face opposite said lens coated with a radioactive material emitting alpha particles which bombard said zinc sulphide coated lens face to produce the luminous glow, said lens arranged to concentrate a maximum amount of light from said glow on the collimator.

THOMAS T. HOLME.

REFERENCES CITED

The following references are of record in the file of this patent:

UNITED STATES PATENTS

| Number | Name | Date |
| --- | --- | --- |
| 683,203 | Grubb | Sept. 24, 1901 |
| 863,287 | Kunz | Aug. 13, 1907 |
| 1,302,353 | Friedrich | Apr. 29, 1919 |
| 1,442,015 | Tillyer | Jan. 9, 1923 |
| 1,610,532 | Russell et al. | Dec. 14, 1926 |
| 2,240,156 | Feldman | Apr. 29, 1941 |
| 2,293,138 | Hayward | Aug. 18, 1942 |